United States Patent

[11] 3,632,873

[72] Inventor Louis L. Henkin
5940 Stafford Ave., Huntington Park, Calif. 90255

[21] Appl. No. 833,252
[22] Filed June 16, 1969
[45] Patented Jan. 4, 1972

[54] TELEVISION VIEWING AND PROJECTION DEVICE
7 Claims, 4 Drawing Figs.

[52] U.S. Cl. .......... 178/7.85
[51] Int. Cl. .......... H04n 5/72
[50] Field of Search .......... 178/7.5, 6.5, 7.82, 7.85; 352/43, 86

[56] References Cited

UNITED STATES PATENTS 2,295,802 9/1942 Nicoll .......... 178/7.85
Re22,115 6/1942 Herbst .......... 178/7.85
3,807,551 4/1970 Stetten .......... 178/7.85

*Primary Examiner*—Richard Murray
*Assistant Examiner*—Barry Leibowitz
*Attorney*—William C. Babcock

ABSTRACT: A device, which when used while viewing the lighted images appearing on a television screen, reproduces said images with but a minor loss in light intensity, free of scan lines and harsh lines that are tiring to the eye when viewed over a prolonged period of time, with the reproduced images presenting a sense of depth relative to one another that is not apparent in the images seen on a television screen when viewed without the device. When the viewing device of the present invention is used while watching images appearing on a television screen, the device may be adapted to filter out all harmful radiation emitted by the television set towards the viewer, as well as remove infrared light from the reproduced images, which infrared light is also tiring to the eyes. The device while illustrated and described in conjunction with a television screen, is equally applicable for use with any concavo-convex surface on which an image is defined.

PATENTED JAN 4 1972

3,632,873

INVENTOR.
LOUIS L. HENKIN
BY
William G. Babcock
ATTORNEY

TELEVISION VIEWING AND PROJECTION DEVICE

BACKGROUND OF THE INVENTION

1. Field of the Invention

Television viewing device.

2. Description of the Prior Art

In the past, various types of liquid-filled lenses have been devised and used to a limited extent for viewing the lighted images appearing on a television screen, primarily for the purpose of magnifying said images. However, numerous inherent operational disadvantages have been found in such prior art lenses when used for viewing the lighted images shown on a television screen, such as:

1. Imparting of halos to the viewed images resulting from chromatic aberration.
2. Limited angle at which the images on the screen may be viewed.
3. Distortion of viewed images.
4. Loss of light intensity in viewed images.
5. Blurring of viewed images.
6. Diffusion of colors and boundaries of objects in viewed images.

When the present invention is used for viewing lighted images on a television screen it overcomes the operational disadvantages found in prior devices of the type described for this purpose, and in addition, provides the advantages previously described.

SUMMARY OF THE INVENTION

A liquid-filled lens structure that may be disposed in front of a television screen, with the lens characterized by the liquid contained therein being a transparent dispersion. This transparent dispersion includes a liquid-dispersing phase in which a plurality of dispersed liquid globules of various sizes and shapes are disposed that act as a plurality of lenses, with the light rays from the images on the television screen pursuing zigzag paths as they traverse said globules, and the images on said screen being reproduced with certain desirable viewing characteristics.

The images reproduced by the viewing devices are substantially free of scan lines and harsh, sharply defined lines and colors which are tiring to the eyes when viewed over a prolonged period of time. The reproduced images also impart a sense of depth relative to the various components that define the same, which sense of depth is totally lacking when the images appearing on the television screen are viewed without use of the present invention.

A major object of the viewing device is to provide a liquid dispersion-filled lens that is disposed in front of the screen of a television cathode tube, and when so disposed, reproduces the lighted images on the screen, substantially free of scan lines and harsh boundary and color definitions.

Another object of the invention is to supply a liquid dispersion-filled lens that reproduces the lighted images on the television screen without linear distortion thereof, with the components of the reproduced images appearing to be spaced in depth relative to one another.

Yet another object of the invention is to furnish a liquid dispersion-filled lens that permits a user to view reproduced images of the images shown on a television screen with little or no loss in the brightness or color thereof, and without the viewer being subjected to the effects of infrared light from the screen or harmful radiation that may emanate from the television set.

DESCRIPTION OF THE PREFERRED EMBODIMENT

Figure 1:
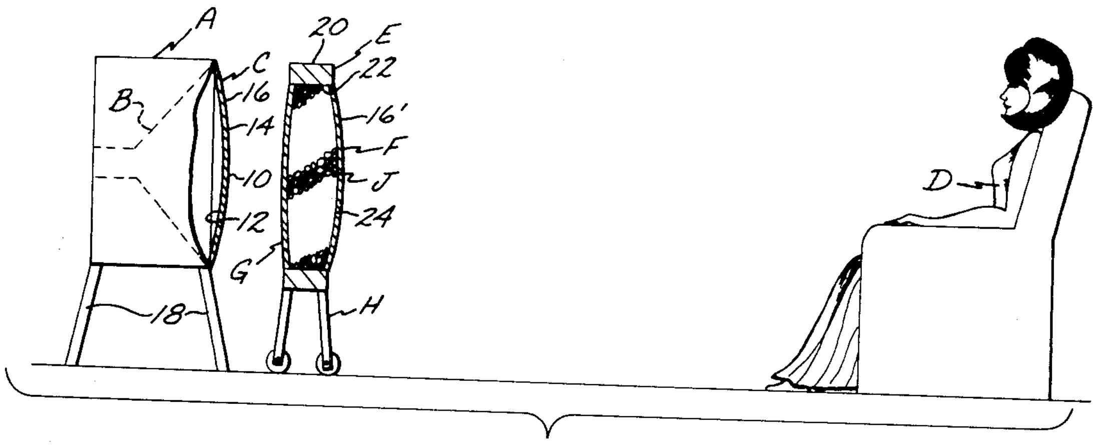
FIG. 1 is a combined side elevational and vertical cross-sectional view of a conventional television set, together with the liquid dispersion-filled lens used therewith.

In FIG. 1 is a conventional television set A is shown that includes a cathode tube B that has a concavo-convex forward lens C. Lens C is defined by a forward surface 10 and rear surface 12. Surface 12 is coated with a layer 14 of fluorescent material, which material is activated to emit light for a short period of time after a stream of electrons (not shown) impinges thereon. The stream of electrons moves back and forth over layer 14, and causes the fluorescent material of this layer to emit light in the form of plurality of images 16, which are visible to a viewer D situated forwardly of the set A. The lens C and layer 14 comprise the screen of the television set A. The configuration of the images 16 constantly change, and as a result scan lines (not shown) are included as a part of these images due to the sweep of the stream of electrons (not shown). Such scan lines are not only annoying, but tiring to the eyes when the images are viewed for any sustained length of time.

The period of activation of each unit of area of layer 14 must be very short, for each area must have ceased emitting light prior to once again being swept over by the moving stream of electrons. The moving stream of electrons (not shown) activates the layer 14 to not only emit light in the visible spectrum, but infrared radiation as well. The infrared radiation is tiring on the eyes when the images 16 are viewed over a prolonged period of time.

Figure 2:
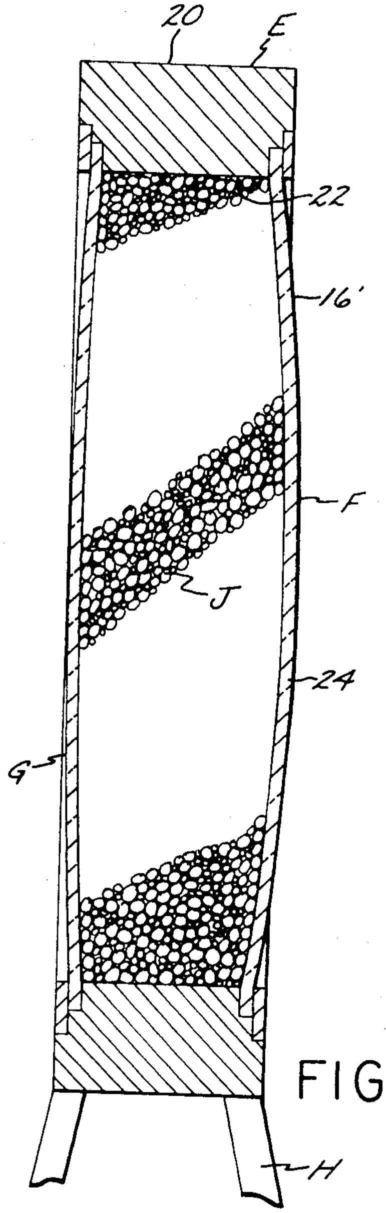
FIG. 2 is an enlarged vertical cross-sectional view of the liquid dispersion-filled lens, illustrating the variation in size and shape of the dispersed globules therein that serve as a plurality of lenses to reproduce the initially defined image on the television screen, but with globules being greatly exaggerated as to size.
Figure 4:
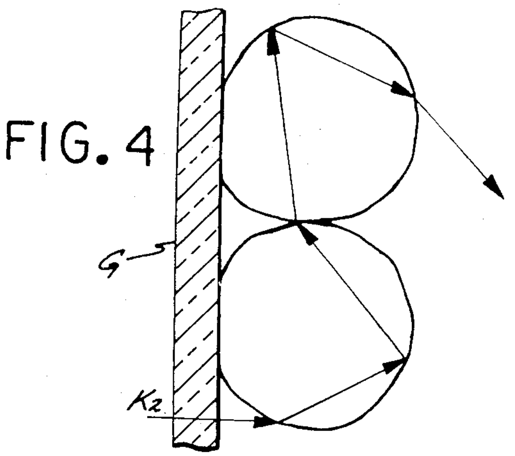
FIG. 4 is a fragmentary, vertical, cross-sectional view of a portion of the rear lens and two of said globules in abutting contact therewith, illustrating the manner in which a ray of light from said image on said screen pursues a zigzag path through said globules, as well as other of said globules (not shown) adjacent thereto.

The television set A is supported at a desired elevation by conventional means such as legs 18, a table or the like. The television viewing device E, as may best be seen in FIGS. 1 and 2, includes an opaque frame 20 in which an opening 22 is formed that is of the same general shape as the lens C and of at least as great cross-sectional area. The frame 20 is supported forwardly of the lens C in horizontal axial alignment therewith.

A forward concavo-convex lens F closes the forward portion of opening 22 and is sealingly supported in the frame 20 by conventional means. A rear lens G that is preferably slightly concavo-convex in shape, closes the rear portion of opening 22, with the lens G being sealingly supported in frame 20. The rear lens G as used herein should be considered to also include a plate of rigid transparent material that is of uniform or varying thickness.

The frame 20 may be supported forwardly of the lens C by a carriage H, as illustrated in FIG. 1, or other conventional means such as legs (not shown), and the like, or brackets (not shown) that are secured to the set A. If desired, the frame E may be included as a part of the television set A, and serve as a shield to protect viewer D if the tube B should break or explode.

The forward lens F is provided with a forward surface 24 that is of the same curvature and configuration as forward face 10 of lens C. Forward lens F and rear lens G cooperate with frame E to define a confined space 26 that is filled with a transparent liquid dispersion J.

The forward lens F is preferably formed from "Plexiglas" which is the trademark for a transparent acrylic resin plastic manufactured by Rohm & Haas Company. "Plexiglas" transmits all colors of the visible spectrum with 91 to 92 percent efficiency, and is inert to the materials defining the dispersion J.

The dispersion J includes a dispersing phase 28 that is paint store variety benzene or turpentine, and comprises 20 to 25 percent by volume of the dispersion J.

The dispersed phase 30, which is 75 to 80 percent of the dispersion, is made up of four transparent mineral oils of different physical characteristics as to weight and specific gravities. Applicant has found that mineral oils as sold in paint stores under the headings of heavy, medium, light, etc. and who's specific gravities vary accordingly are sufficient for construction of applicant's invention.

Figure 3:
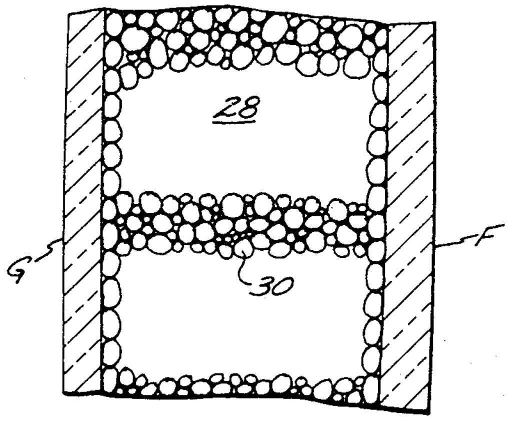
FIG. 3 is an enlarged view of a section of FIG. 2.

The dispersion J is preferably prepared by sequentially pouring the four oils, above identified, into the benzene or turpentine with agitation. The agitation is continued during the pouring operation and thereafter until the oils are dispersed in the benzene or turpentine as tiny globules. The dispersion J is clear and transparent in appearance. This dispersion J in the agitated state is then poured into the interior of the lens where due to the differences in weight and specific gravity of the four oils it takes the layered form shown in FIGS. 2 and 3.

The rear lens G and forward lens F, together with the dispersion J, cooperatively reproduce the image 16 as a lighted image 16' that emerges from the forward surface 24 of the lens F. The reproduced images 16' are substantially free of scan lines, with the sharp edges and bright colors of the original images 16 being softened to the extent that these images do not tire the eyes of the viewer D, even after watching the images over a prolonged period of time.

Additionally the lens F and G cooperate with the dispersion J therebetween to form a thick convex lens that is capable of magnifying the images 16 on the lens or screen C. If the space between lens F and G was filled with a transparent liquid, the viewer D would see but a single-magnified vertical image of the image 16 on the lens or screen C, for all light emanating from screen C that forms the virtual image would be refracted by lens F and G and dispersion J to the same degree.

However, in applicant's invention there is a dispersion between the F and G, with each globule of the dispersed phase acting as an individual lens. Pencils of light between the images 16 on screen C entering the dispersion J through the lens G will be refracted to different degrees depending on whether they pass through the dispersion phase only, the dispersed phase only, or a combination thereof. Due to the different degrees to which the light is refracted at least two different virtual images will be formed that appear to be at different distances from the viewer D. The viewer's eyes will attempt to focus on these multiple virtual images and in so doing a sense of depth is imparted to the viewer, for these virtual images appear to be at different distances from the viewer.

The illuminated images 16 are, in part, defined by infrared radiation, which as previously mentioned, is tiring to the eyes. Should it be desired to remove infrared radiation from the reproduced image 16', approximately 1 gram of finely divided copper oxide is dispersed in each gallon of the dispersing phase 28 in the confined space 26. The copper oxide serves to filter out infrared radiation that is discharged into the dispersion J.

A television set A that is improperly adjusted, or one that is poorly designed, may discharge high-frequency radiation which is harmful to the viewer D. The viewing apparatus E may be used as a shield against such radiation by suspending finely divided lead sulphate in the dispersing phase 28. Two grams of lead sulphate are added to each gallon of dispersing phase 28 to provide such a shield.

The above-identified invention has been described and illustrated in conjunction with a television screen, but it may if desired be used with any concavo-convex surface on which an image is visible. In describing the invention, the lenses F and G are shown and described as being held in fixed spaced relationship by a frame 20. However, if desired, the peripheral edges of the lenses F and G may be caused to merge into one another in sealing engagement and the frame 20 eliminated as a result thereof.

I claim:

1. A device that when interposed between a television screen and the viewer is capable of magnifying the lighted image on said screen and imparting a sense of depth of said magnified image to the viewer, said screen having a convex exterior surface, said device including:

a. forward and rearward concavo-convex lens in laterally spaced relationship that are axially aligned with said screen and in front thereof, which lens are formed from a transparent rigid resin that transmits substantially all colors of the visible spectrum, said lens having the convex surface thereof exteriorly and oppositely disposed to one another, with said convex surface of said forward lens being most adjacently disposed to the viewer and of substantially the same curvature as the forward face of said screen;

b. means for sealingly connecting the peripheral edges of said forward and rear lens and cooperating with said lens to define a confined space therebetween;

c. a transparent liquid organic dispersion that fills said confined space and comprises a first dispersed phase in the form of a plurality of small globules of a transparent organic liquid, said small globules acting as a plurality of lens, and a dispersing phase in the form of a transparent liquid that is immiscible with said liquid defining said globules, with said liquid defining said dispersing phase and said liquid defining said globules having different indexes of refraction, with said image on said screen when viewed by said viewer through said forward and rear lens and said organic dispersion being magnified as to size and being visible as a plurality of magnified virtual images that appear to be in spaced depth relationship to one another due to the light from said image on said screen being refracted to different degrees as it passes through said lens, said dispersing phase and said dispersed phase.

2. A device as defined in claim 1 wherein said first dispersed phase comprises a mineral oil.

3. A device as defined in claim 1 wherein said first dispersed phase comprises a plurality of different mineral oils, with each of said oils being of a different specific gravity, and with each of said mineral oils defining said globules that are different in size from said globules defined by the other of said mineral oils.

4. A device as defined in claim 2 wherein said dispersing phase comprises a liquid selected from a group consisting of turpentine and benzene.

5. A device as defined in claim 2 wherein said mineral oil comprises substantially 70 percent by volume of said dispersion.

6. A device as defined in claim 5 wherein substantially 30 percent of said dispersion comprises a liquid dispersing phase of a liquid selected from the group consisting of benzene and turpentine.

7. A device as defined in claim 2 in which said first means includes;

d. a frame in which an opening of a cross section at least as great as that of said screen is formed, with said first and second lenses sealing engaging the forward and rear portions of said opening; and e. second means for supporting said frame and lenses in a substantially vertical position forwardly of said, with said opening and lenses in axial alignment with said surface.

* * * * *